US009266237B2

(12) United States Patent
Nomura

(10) Patent No.: US 9,266,237 B2
(45) Date of Patent: Feb. 23, 2016

(54) OBJECT GRIPPING SYSTEM, OBJECT GRIPPING METHOD, STORAGE MEDIUM AND ROBOT SYSTEM

(75) Inventor: Osamu Nomura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 991 days.

(21) Appl. No.: 13/225,728

(22) Filed: Sep. 6, 2011

(65) Prior Publication Data

US 2012/0059517 A1    Mar. 8, 2012

(30) Foreign Application Priority Data

Sep. 7, 2010  (JP) ................................. 2010-200290

(51) Int. Cl.
*G06F 19/00* (2011.01)
*B25J 9/16* (2006.01)
(Continued)

(52) U.S. Cl.
CPC ............... *B25J 9/1612* (2013.01); *B23P 19/00* (2013.01); *B23P 19/001* (2013.01); *B25J 9/1656* (2013.01);
(Continued)

(58) Field of Classification Search
CPC ...... B25J 9/1656; B25J 9/1669; B25J 9/1612; B25J 15/0004; B25J 15/06; B25J 15/10; B25J 9/1664; B25J 9/1697; G06T 7/004; G06K 9/78; B23P 19/00; B23P 19/001; B23P 19/002; B23P 19/008; B23P 19/04; G05B 2219/45063; Y10S 901/02
USPC ......... 700/213, 228, 245, 250, 253, 259, 262; 382/153, 152; 901/30, 31, 39; 294/106, 294/198, 94, 95, 87.1; 27/709, 714, 559, 27/428; 29/559
See application file for complete search history.

(56) References Cited

U.S. PATENT DOCUMENTS 4,980,626 A * 12/1990 Hess et al. ............... 318/568.16
4,985,846 A *  1/1991 Fallon ........................ 382/153
(Continued)

FOREIGN PATENT DOCUMENTS

JP    05-305588 A    11/1993
JP    10-249765 A     9/1998
(Continued)

OTHER PUBLICATIONS

Mark R. Cutkosky, On Grasp Choice, Grasp Models, and the Design of Hands for Manufacturing Tasks, Jun. 1989, IEEE Transactions on Robotics and Automation, vol. 5, No. 3, pp. 269-279.*

(Continued)

*Primary Examiner* — Thomas G Black
*Assistant Examiner* — Sze-Hon Kong
(74) *Attorney, Agent, or Firm* — Fitzpatrick, Cella, Harper & Scinto

(57) ABSTRACT

A system comprises: a measurement unit adapted to measure a position/orientation of at least one target object based on an image obtained by capturing the at least one target object; a selection unit adapted to select at least one grippable target object based on the position/orientation; a determination unit adapted to determine, as an object to be gripped, a grippable target object in a state with a highest priority from the at least one grippable target object based on priorities set in advance for states including gripping positions/directions; a gripping unit adapted to grip the object to be gripped in the state with the highest priority; and a changing unit adapted to change the state of the gripped object, to a state in which the gripped object is assembled to the other object.

14 Claims, 14 Drawing Sheets

(51) Int. Cl.
B25J 15/10 (2006.01)
B25J 15/06 (2006.01)
B23P 19/00 (2006.01)
B25J 15/00 (2006.01)

(52) U.S. Cl.
CPC .............. *B25J 9/1664* (2013.01); *B25J 9/1669* (2013.01); *B25J 9/1697* (2013.01); *B25J 15/0004* (2013.01); *B25J 15/06* (2013.01); *B25J 15/10* (2013.01); *G05B 2219/37555* (2013.01); *G05B 2219/39486* (2013.01); *G05B 2219/39508* (2013.01); *G05B 2219/40053* (2013.01); *G05B 2219/45063* (2013.01)

(56) References Cited

U.S. PATENT DOCUMENTS

| | | | | |
|---|---|---|---|---|
| 5,062,673 A * | 11/1991 | Mimura | ........................ | 294/111 |
| 5,325,468 A * | 6/1994 | Terasaki et al. | ................ | 700/262 |
| 5,368,428 A * | 11/1994 | Hussey et al. | ...................... | 414/1 |
| 5,446,835 A * | 8/1995 | Iida | ........................ | B25J 9/1687 |
| | | | | 700/259 |
| 5,513,299 A * | 4/1996 | Terasaki et al. | ................ | 700/255 |
| 5,608,847 A * | 3/1997 | Pryor | ............................ | 700/248 |
| 6,141,863 A | 11/2000 | Hara et al. | ........................ | 29/714 |
| 6,328,523 B1 * | 12/2001 | Watanabe et al. | ........ | 414/416.01 |
| 6,435,582 B1 * | 8/2002 | DaSilva et al. | .................. | 294/94 |
| 6,675,068 B1 * | 1/2004 | Kawasaki | ....................... | 700/245 |
| 7,313,464 B1 * | 12/2007 | Perreault et al. | .............. | 700/245 |
| 7,331,094 B2 * | 2/2008 | Berninger | ................. | 29/407.05 |
| 7,407,208 B2 * | 8/2008 | Tadano | ........................... | 294/111 |
| 7,415,321 B2 * | 8/2008 | Okazaki et al. | ............... | 700/245 |
| 7,445,260 B2 * | 11/2008 | Nihei et al. | ................... | 294/106 |
| 7,474,939 B2 * | 1/2009 | Oda et al. | ....................... | 700/245 |
| 7,657,346 B2 * | 2/2010 | Ban et al. | ....................... | 700/262 |
| 7,706,918 B2 * | 4/2010 | Sato et al. | ...................... | 700/245 |
| 8,260,458 B2 * | 9/2012 | Kim et al. | ...................... | 700/245 |
| 8,295,975 B2 * | 10/2012 | Arimatsu et al. | ............. | 700/216 |
| 8,315,739 B2 * | 11/2012 | Dai | ................................ | 700/259 |
| 8,369,983 B2 * | 2/2013 | Sato et al. | ...................... | 700/220 |
| 8,559,699 B2 * | 10/2013 | Boca | ............................. | 382/153 |
| 8,660,697 B2 * | 2/2014 | Handa et al. | .................. | 700/259 |
| 2004/0186624 A1 * | 9/2004 | Oda et al. | ....................... | 700/245 |
| 2005/0065654 A1 * | 3/2005 | Hariki et al. | .................... | 700/245 |
| 2006/0012198 A1 * | 1/2006 | Hager et al. | .................. | 294/106 |
| 2006/0104788 A1 * | 5/2006 | Ban et al. | ....................... | 414/729 |
| 2007/0177790 A1 * | 8/2007 | Ban | ......................... | B25J 9/1697 |
| | | | | 382/153 |
| 2007/0274812 A1 * | 11/2007 | Ban et al. | ....................... | 414/217 |
| 2008/0181485 A1 * | 7/2008 | Beis et al. | ...................... | 382/153 |
| 2010/0078953 A1 * | 4/2010 | Ban et al. | ....................... | 294/106 |
| 2011/0010009 A1 * | 1/2011 | Saito | ...................... | B25J 9/1612 |
| | | | | 700/253 |
| 2011/0280472 A1 * | 11/2011 | Wallack et al. | ............... | 382/153 |
| 2013/0204437 A1 * | 8/2013 | Koselka et al. | ............... | 700/259 |

FOREIGN PATENT DOCUMENTS

| | | |
|---|---|---|
| JP | 2005-349491 A | 12/2005 |
| JP | 2007-245283 A | 9/2007 |

OTHER PUBLICATIONS

V. Lepetit, et al., "Keypoint Recognition Using Randomized Trees", IEEE Transactions on Pattern Analysis and Machine Intelligence, 2006, vol. 28, No. 9.
May 2, 2014 Japanese Office Action in Japanese Patent Application No. 2010-200290.

* cited by examiner

F I G. 1
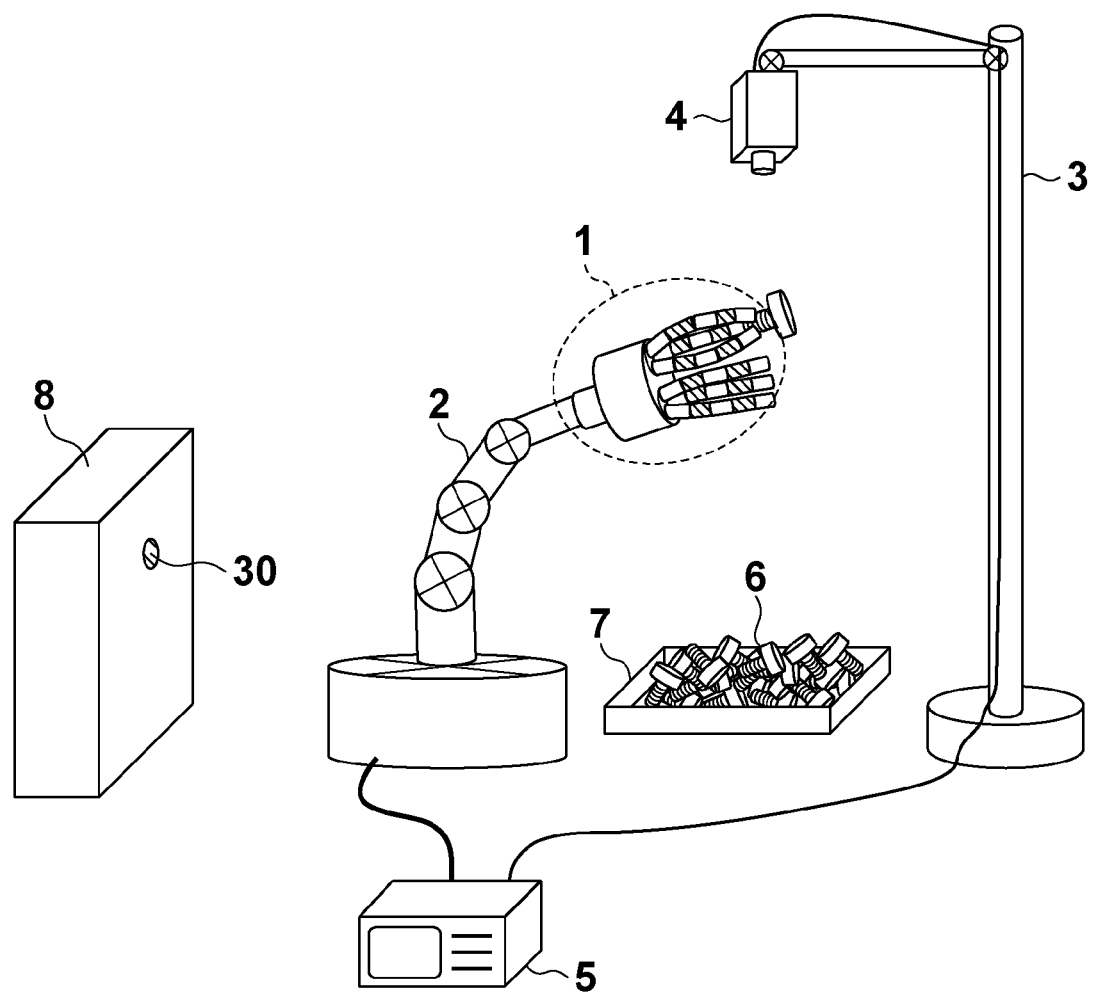

OBJECT GRIPPING SYSTEM, OBJECT GRIPPING METHOD, STORAGE MEDIUM AND ROBOT SYSTEM

BACKGROUND OF THE INVENTION

1. Field of the Invention

The present invention relates to an object gripping system, an object gripping method, a storage medium, and a robot system.

2. Description of the Related Art

Japanese Patent Laid-Open No. 2005-349491 discloses a robot hand which can change the way a gripped object is held with one hand and smoothly shift to the next operation. This robot hand includes a plurality of finger mechanisms, each of which includes a plurality of joint portions and rotating portions. This makes it possible to change the gripping state of a gripped object.

A conventional gripping portion is not designed to grip an object by selecting a gripping position on the object or a relative orientation between the object and the gripping portion in consideration of a change to a gripping state required in a subsequent process. For this reason, while the gripping portion grips an object, the portion undergoes many large changes in gripping state. In this case, the position and orientation change amount of the object increases to result in dropping the object when changing the gripping state or increasing the tact time required to change the gripping state.

In consideration of the above problems, the present invention provides a technique for measuring the position and orientation of an object from an image obtained by capturing the object, and gripping the object in consideration of a change to the gripping position on the object or the relative orientation which is required in a subsequent process.

SUMMARY OF THE INVENTION

According to one aspect of the present invention, there is provided an object gripping system comprising: a position and orientation measurement unit adapted to measure a position and orientation of at least one target object based on an image obtained by capturing the at least one target object; a selection unit adapted to select at least one grippable target object based on the position and orientation; a determination unit adapted to determine, as an object to be gripped, a grippable target object in a state with a highest priority from the at least one grippable target object which is selected by the selection unit, based on priorities set in advance for states including gripping positions or gripping directions; a gripping unit adapted to grip the object to be gripped, which is determined by the determination unit, in the state with the highest priority; and a changing unit adapted to change the state of the gripped object, which is gripped by the gripping unit, to a state in which the gripped object is assembled to the other object.

According to another aspect of the present invention, there is provided an object gripping system comprising: a position and orientation measurement unit adapted to measure a position and orientation of at least one target object based on an image obtained by capturing the at least one target object; a selection unit adapted to select at least one grippable target object based on the position and orientation; a determination unit adapted to determine, as an object to be gripped, a target object, from the at least one grippable target object which is selected by the selection unit, which is configured to be gripped at a gripping position closest to a gripping position at which the target object is assembled to another object; a gripping unit adapted to grip the object to be gripped which is determined by the determination unit; and a changing unit adapted to change the gripping position and gripping direction of the object gripped by the gripping unit to a gripping position and gripping direction to be set when the gripped object is assembled to the other object.

Further features of the present invention will be apparent from the following description of exemplary embodiments with reference to the attached drawings.

BRIEF DESCRIPTION OF THE DRAWINGS

FIG. 1 is a perspective view showing an object gripping system;

DESCRIPTION OF THE EMBODIMENTS

Figure 2A:
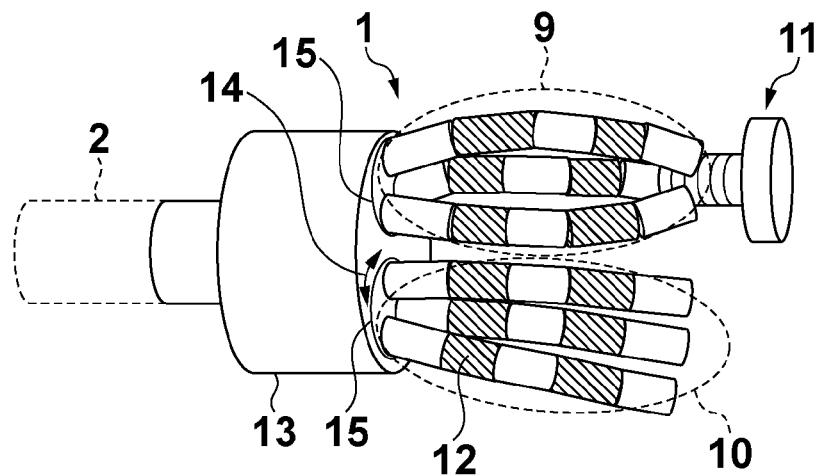
FIGS. 2A to 2C are views each showing an end effector.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

This embodiment will exemplify an object gripping system that grips one or one of two or more parts and is used in a robot system configured to execute tasks such as picking parts and assembling them on, for example, a production line or the like in a factory.

The arrangement of the object gripping system will be described below first with reference to FIG. 1. The object gripping system includes a robot arm 2 having a multi-fingered hand 1 as an end effector, a support column 3, a camera 4 held on the support column 3, and a controller 5 which controls the multi-fingered hand 1, the robot arm 2, and the camera 4. Note that FIG. 1 shows a parts supply box 7 in which parts 6 as processing target objects are piled up and a main body part 8 which is a part on which the part 6 is to be mounted. In this case, the controller 5 generally includes a computer. However, this embodiment is not limited to this arrangement.

Figure 2B:
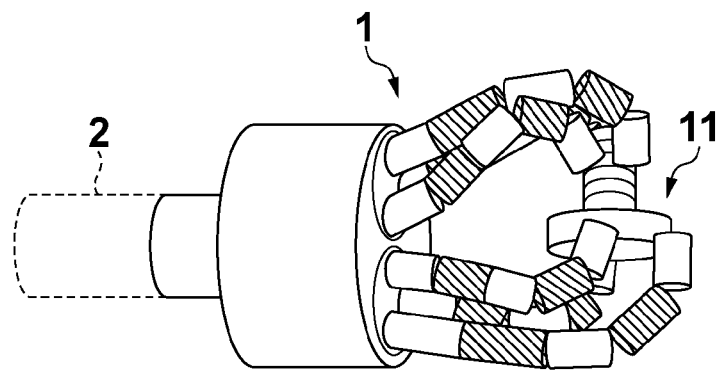
Figure 2C:
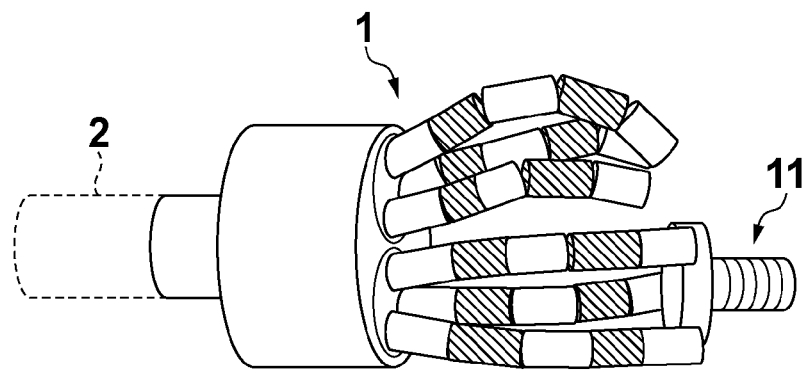

The arrangement of the multi-fingered hand 1 as an end effector will be described with reference to FIG. 2A. As shown in FIG. 2A, the multi-fingered hand 1 in this embodiment includes three initial gripping fingers 9 which grip one of piled up parts and three re-holding fingers 10 which are used when it is necessary to change the gripping state of a part for an assembly process. When, for example, as shown in FIG. 2A, a part 11 is held by three-point support using the initial gripping fingers 9, the gripping position on the part 11 and the relative orientation between the part 11 and the multi-fingered hand 1 are changed, as needed, by using the re-holding fingers 10. This can change the gripping state of the part 11. For example, as shown in FIGS. 2B and 2C, each finger of the multi-fingered hand 1 has a plurality of joints, and the initial gripping fingers 9 and the re-holding fingers 10 cooperatively operate to allow change in the way a part is held. Note that the multi-fingered hand 1 in this embodiment has extensible portions 12 (the hatched portions in FIG. 2A), and changes the lengths of the fingers as needed at the time of the above re-holding operation. A seat portion 13 to which the respective fingers are attached has mechanisms 15 each of which rotates while holding the relative positional relationship between the three fingers as indicated by arrows 14 in FIG. 2A.

Note that in this embodiment, as will be described later, a plurality of patterns of object gripping states assigned with priorities are set, and re-holding operations between the respective gripping state patterns are also set in advance. This makes it possible to select an operation control pattern for the multi-fingered hand 1 by selecting one of the gripping state patterns at the time of actual operation of the object gripping system. The arrangement and function of the multi-fingered hand 1 are not limited to those described above. The multi-fingered hand 1 can take any arrangement as long as it allows re-holding operation.

Figure 3:
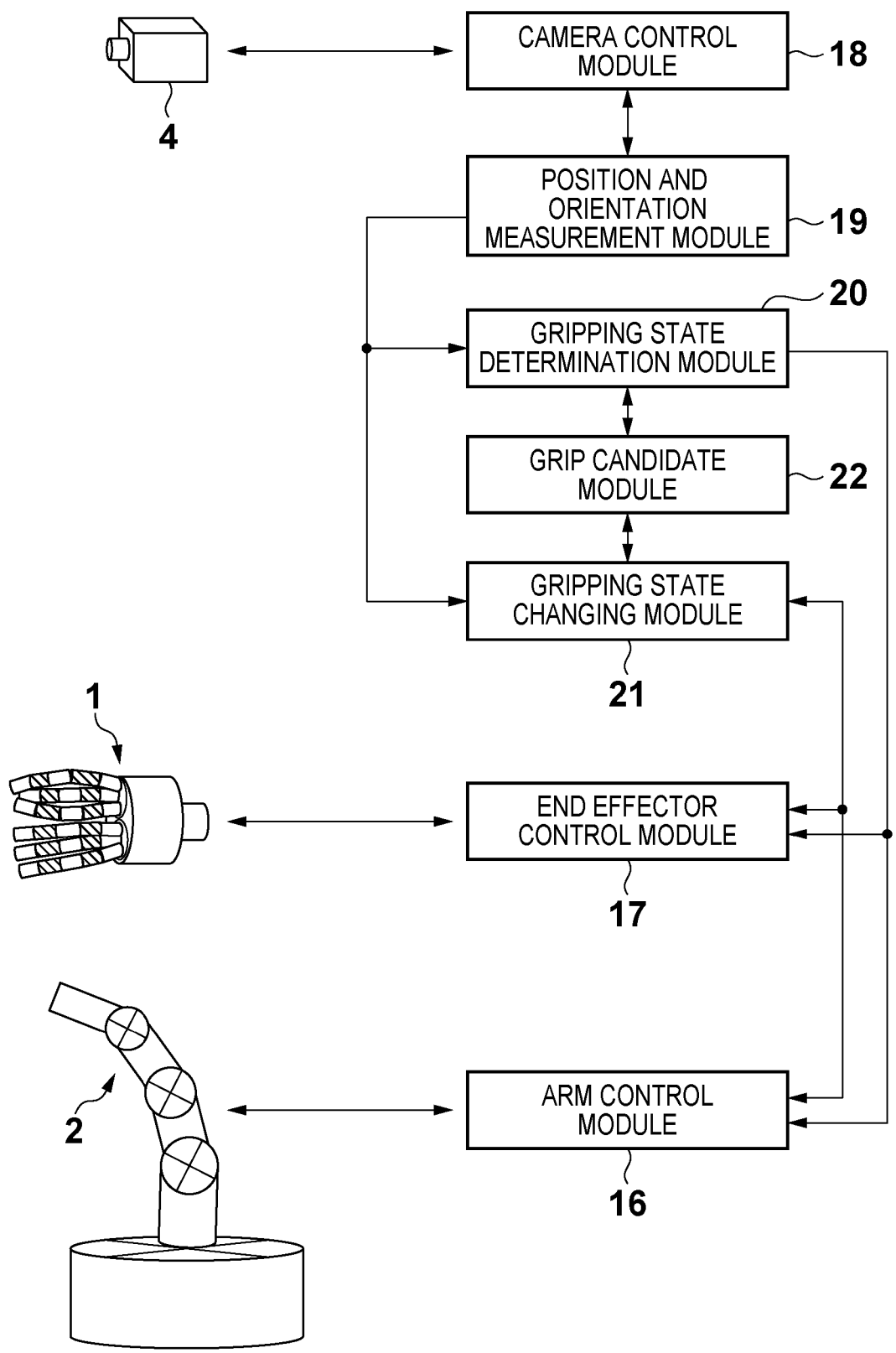
FIG. 3 is a view showing the functional arrangement of an object gripping system.

The functional arrangement for processing implemented by the controller 5 will be described with reference to FIG. 3. Referring to FIG. 3, an arm control module 16 has a function of controlling the operation of the robot arm 2. An end effector control module 17 has a function of controlling the operation of the multi-fingered hand 1. The arm control module 16 and the end effector control module 17 implement, together with the robot arm 2 including the multi-fingered hand 1 described above, the function of a gripping unit. A camera control module 18 has a function of controlling the operation of the camera 4 and acquiring/transferring images. The camera control module 18 implements, together with the camera 4, the function of an image capturing unit. A position and orientation measurement module 19 has a function as a position and orientation measurement unit which measures the spatial position and orientation of a target object from an image captured by the camera 4. A gripping state determination module 20 has a function as a gripping state determination unit which selects an object gripping state based on the position and orientation measurement result obtained by the position and orientation measurement module 19. A gripping state changing module 21 has a function as a gripping state changing unit which changes the object gripping state, based on the position and orientation measurement result obtained by the position and orientation measurement module 19.

A grip candidate module 22 holds grip priority candidate data set in advance. The grip candidate module 22 and grip priority candidate data will be described in detail later.

In this embodiment, the modules and units which implement the respective functions are defined in the above manner, but these definitions do not limit the scope of the present invention. For example, the gripping state changing module 21 is defined as a gripping state changing unit. However, this unit may be defined as a unit including the end effector and the end effector control module 17. That is, the above definitions are set to explain the units which are required by the object gripping system exemplified by this embodiment when it implements the processing to be described later, and do not exclude other definitions.

Figure 4:
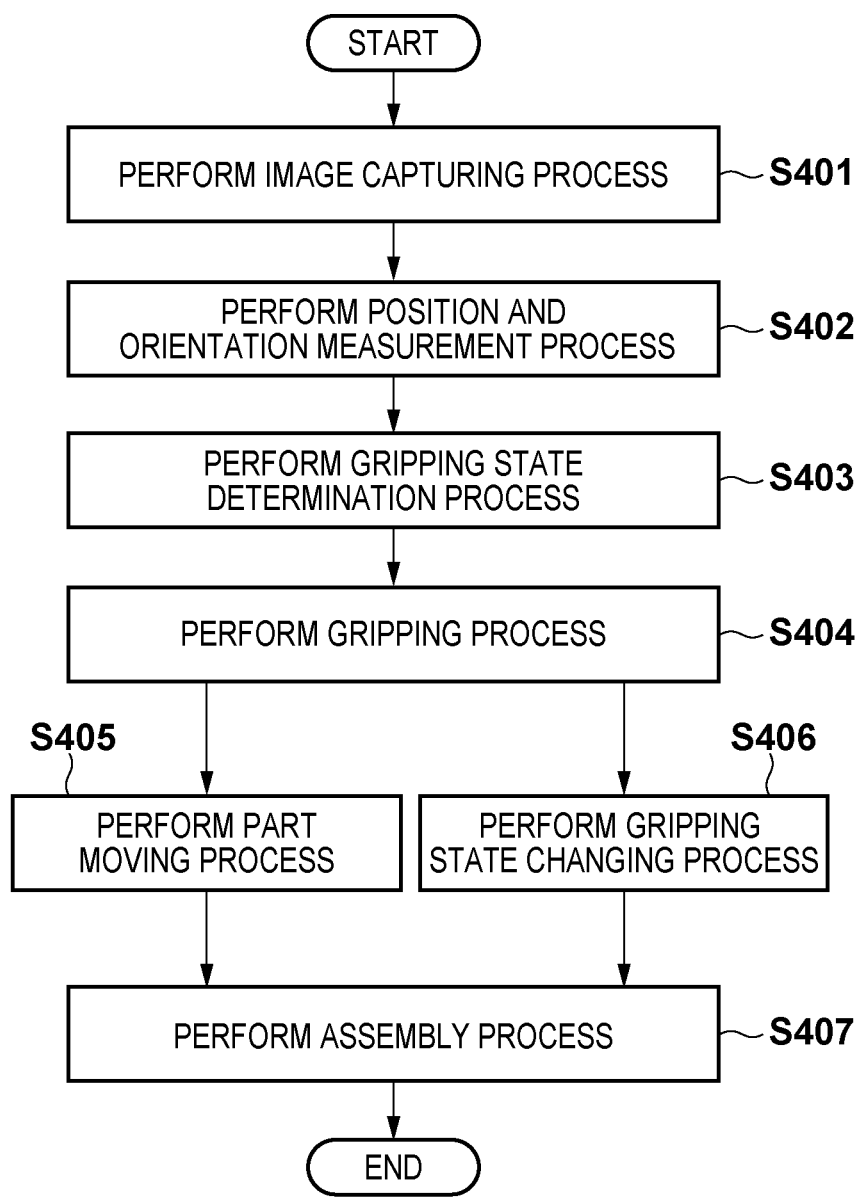
FIG. 4 is a flowchart showing a processing procedure in the object gripping system.

A flowchart showing a processing procedure in the object gripping system according to this embodiment will be described with reference to FIG. 4. In an image capturing process in step S401, the camera 4 captures an image of an area including piled-up parts. In a position and orientation measurement process in step S402, the position and orientation measurement module 19 measures the spatial position and orientation of a target part by using the image captured by the camera 4. In a gripping state determination process in step S403, the gripping state determination module 20 determines the gripping state of the part by the end effector based on the position and orientation measurement result. Note that the gripping state of the part includes a gripping position on the part gripped by the end effector and the relative orientation (gripping direction) between the end effector and the part. In a gripping process in step S404, the arm control module 16 and the end effector control module 17 control the robot arm 2 and the end effector (multi-fingered hand) 1. The end effector then grips the part in the gripping state determined by the gripping state determination module 20.

In a part moving process in step S405, the arm control module 16 and the end effector control module 17 control the robot arm 2 and the end effector (multi-fingered hand) 1. The robot arm and the end effector then move the gripped part to a part assembly start position set in advance in a subsequent process.

In a gripping state changing process in step S406, the gripping state changing module 21 determines the contents of control of changing the gripping state based on the respective pieces of information about the current gripping state of the part and the gripping state required in the subsequent process. The end effector control module 17 controls the end effector (multi-fingered hand) 1, based on the determined contents of control of changing, to change the gripping state of the part to the gripping state required in the subsequent process. Note that in this embodiment, the subsequent process indicates a part assembly process in step S407. Although this embodiment exemplifies the concurrent execution of the part moving process in step S405 and the gripping state changing process in step S406, it is possible to sequentially execute the two processes.

In an assembly process in step S407, the arm control module 16 and the end effector control module 17 control the robot arm 2 and the end effector (multi-fingered hand) 1 to assemble parts set in advance in the subsequent process.

The operation of the object gripping system according to this embodiment will be described in more detail below.

First of all, the object gripping system according to this embodiment grips one of the parts 6 piled up in the parts supply box 7 and supplied as shown in FIG. 1 with the end effector (multi-fingered hand) 1 of the robot arm 2. The system then causes the robot arm 2 to move the part to the assembly start position for the main body part 8 which is a part to be assembled, and executes an assembly process set in advance.

Figure 5:
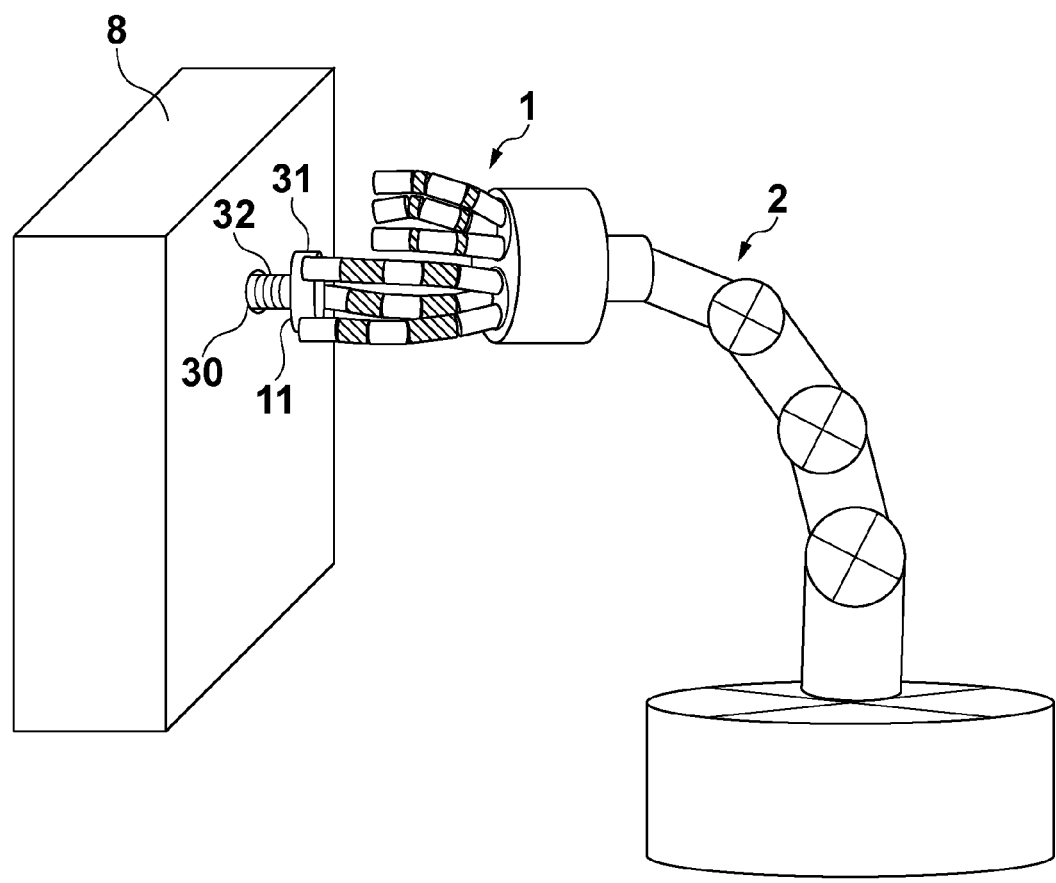
FIG. 5 is a view showing an assembly process.

This embodiment will exemplify the assembly process of inserting the gripped part 11 into a hole 30 of the main body part 8, as shown in FIG. 5. Assume that in this case, the part 11 has a shape having a screw-like head portion 31 and a shaft portion 32, and the entire shaft portion 32 except for the head portion 31 is inserted into the main body part 8.

In order to execute the assembly process, the multi-fingered hand 1 needs to grip the head portion 31 of the part 11. If, however, the parts 11 are supplied in a piled-up state, the multi-fingered hand 1 may not be able to grip the part 11 in a gripping state corresponding to the assembly process.

This embodiment, therefore, sets in advance a plurality of candidates of positions on a part to be gripped by the multi-fingered hand 1 and of relative orientations between the multi-fingered hand 1 and the part 11, as gripping states of the target part to be assembled by the multi-fingered hand 1, together with grip priority levels. The grip candidate module 22 holds the candidates as grip priority candidate data.

Figure 6A:
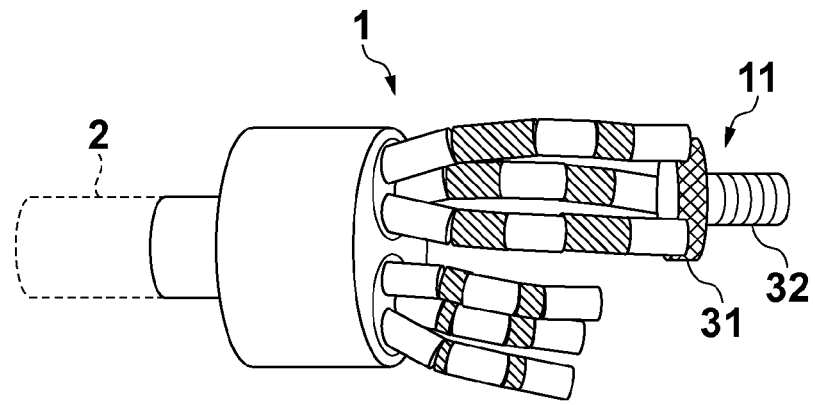
FIGS. 6A to 6C are views showing how a part is gripped.

For example, as described above, when executing an assembly process, the multi-fingered hand 1 needs to grip a circumferential position of the head portion 31 of the part 11, as shown in FIG. 6A. For this reason, a gripping position is set to a circumferential position of the head portion 31 as a gripping state with priority 0. To facilitate understanding, FIG. 6A shows the circumferential position of the head portion 31 in black. In addition, the relative orientation between the multi-fingered hand 1 and the part 11 must be set in assembly operation so as to prevent interference between the multi-fingered hand 1 and the main body part 8. For this reason, as shown in FIG. 6A, the relative orientation is set to locate the head portion 31 of the part on the side close to the multi-fingered hand 1 (locate the shaft portion 32 on the remote side).

Figure 6B:
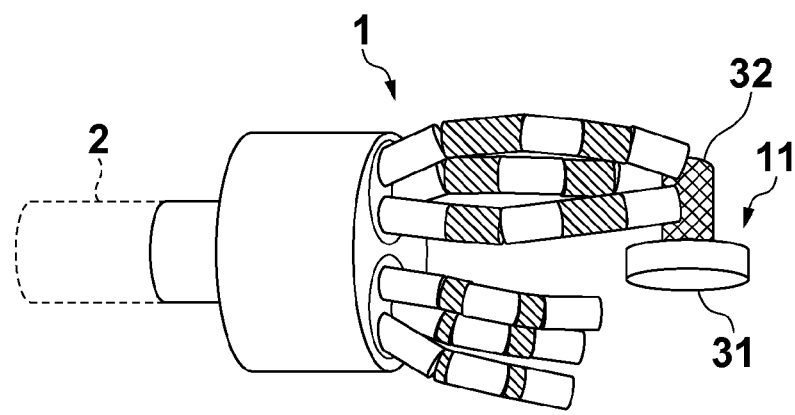

As a gripping state with priority 1, a gripping position is set to an area on the shaft portion 32, as shown in FIG. 6B. To facilitate understanding, FIG. 6B shows the area on the shaft portion 32 in black. In addition, the relative orientation is set to set a direction in which the multi-fingered hand 1 grips the shaft portion 32 from its longitudinal side surface, as shown in FIG. 6B.

Figure 6C:
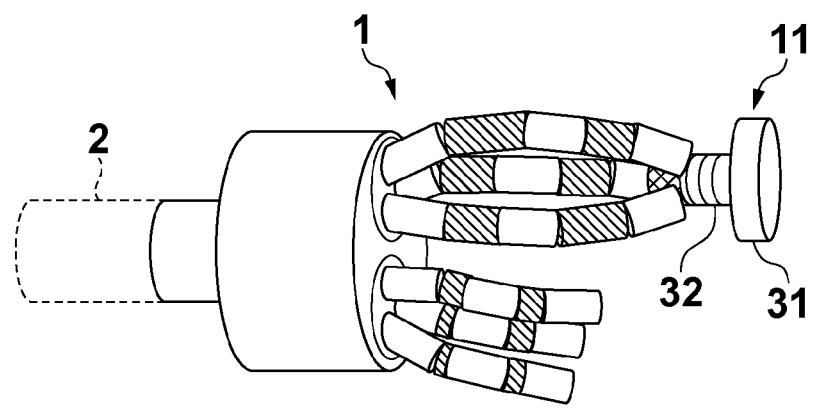

As a gripping state with priority 2, a gripping position is set to the distal end side surface position on the shaft portion 32 of the part 11, as shown in FIG. 6C. To facilitate understanding, FIG. 6C shows the distal end side surface position on the shaft portion 32 in black. In addition, the relative orientation is set to locate the shaft portion 32 of the part 11 on the side close to the multi-fingered hand 1 (locate the head portion 31 on the remote side), as shown in FIG. 6C.

When the multi-fingered hand 1 grips the part 11 in the gripping state with priority 0 among the gripping states set in the above manner, there is no need to change the gripping state of the part 11 for the assembly process. For this reason, priority 0 is set for the gripping state in which a part should be gripped with the highest priority. When the part 11 is gripped in the gripping state with priority 1 or priority 2, the gripping state of the part must be changed to the gripping state with priority 0 so as to execute an assembly process. In this case, the multi-fingered hand 1 changes the gripping state of the part 11 during a part moving process, as will be described later. As is obvious from FIGS. 6A to 6C, when comparing a gripping state change amount from the gripping state with priority 1 with that from the gripping state with priority 2, priority 2, which corresponds to the inverted relative orientation between the multi-fingered hand 1 and the part 11, exhibits a larger gripping state change amount.

The larger the gripping state change amount, the higher the possibility of a mistake such as dropping the part 11. Therefore, the gripping state with priority 2 is assigned with a lower priority.

Assume that in this embodiment, it is possible to both change the gripping state with priority 1 with the multi-fingered hand 1 described above to the gripping state with priority 0 and change the gripping state with priority 2 to the gripping state with priority 0 by one processing operation.

According to the above description, as the gripping position corresponding to priority 1, the area on the shaft portion 32 which has a predetermined degree of freedom is set. However, when the multi-fingered hand 1 actually grip an object, it is possible to select a proper one of gripping states having degrees of freedom. An example of a method of determining one gripping state from gripping states having degrees of freedom will be described later. Note that the technique of setting priority levels is merely an example. It is possible to arbitrarily set priority levels in accordance with the types of parts, the shapes of end effectors, and the contents of processes to be executed by the object gripping system.

The flowchart for the actual operation of the object gripping system according to this embodiment will be described in detail below.

Figure 7A:
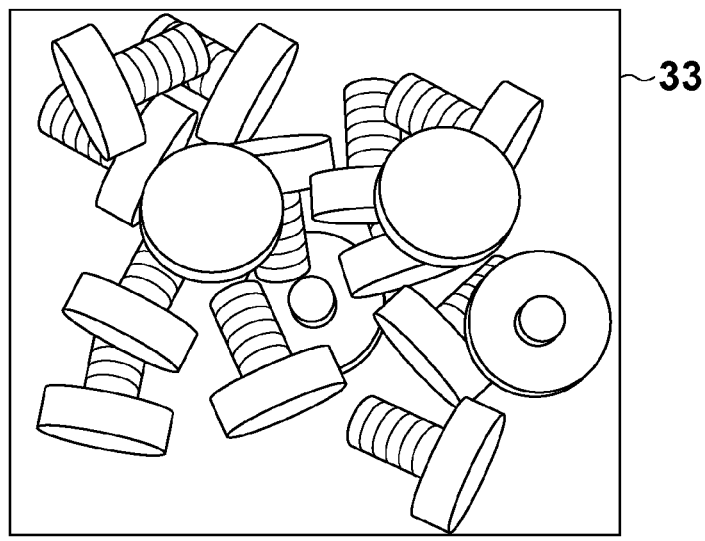
FIGS. 7A and 7B are views showing captured images.

First of all, the object gripping system according to this embodiment executes an image capturing process. As shown in FIG. 7A, in the image capturing process, the system acquires an image 33 including a target object.

In a position and orientation measurement process, the system measures the position and orientation of the part from the captured image 33. Many position and orientation measurement techniques using recognition processing, distance measurement processing, and the like have been proposed as techniques of measuring the position and orientation of the object from the image 33 captured by the camera. This embodiment is assumed to use, for example, the technique disclosed in V. Lepetit and P. Fua, "Keypoint recognition using randomized trees", IEEE Transactions on Pattern Analysis and Machine Intelligence, vol. 28, no. 9, 2006, which uses image features such as feature points and edges detected on a two-dimensional image.

Furthermore, in a position and orientation measurement process in this embodiment, the system determines an area on an object which is hidden by other objects. For example, in this embodiment, the system performs three-dimensional distance measurement by a spatial coding method to calculate distance data in the depth direction of an image. The system compares the distance information of a target part area extracted by recognition processing with the three-dimensional model data of the target part, thereby determining an area which does not match the three-dimensional model data as a hidden area.

In addition, in this process, the system measures the relative positional relationship between the detected part and objects (mainly other parts) existing around the part as the position and orientation of the part. For example, the system uses the distance data calculated in the above manner in the depth direction of the image to compare the distance data of the target part area with the distance data of a surrounding area. This makes it opposable to obtain the correspondence relationship between the target part and the adjacent objects included in the surrounding area.

Figure 7B:
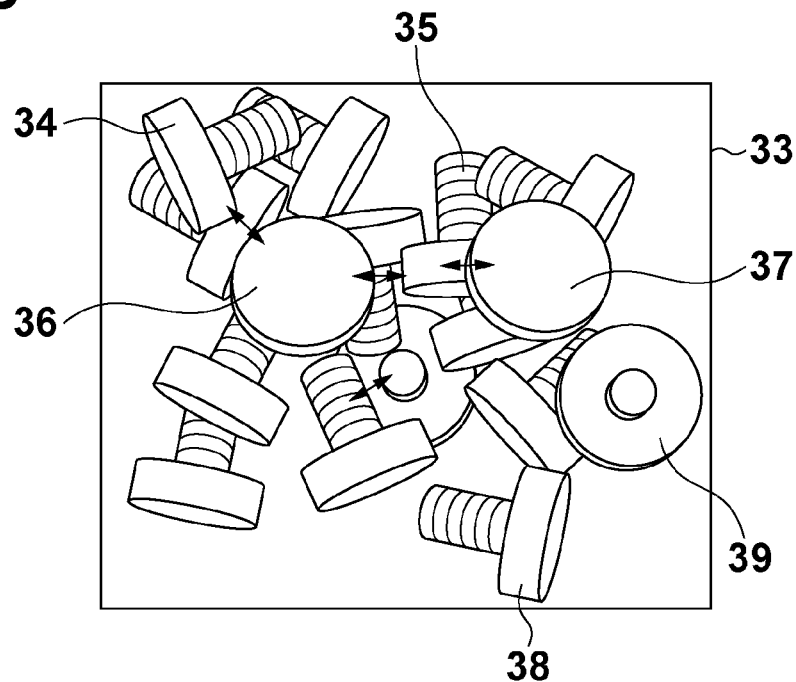

That is, as shown in FIG. 7B, if, for example, the distance data of parts 34 and 35 adjacent to a target part 36 on the image in the depth direction of the image fall within the same range as the distance data of the target part 36 in the depth direction, the parts 34 to 36 exist in the same plane perpendicular to the depth direction from an imaging plane. In this case, if the distances between the respective parts on the image 33 each are smaller than the thickness of each finger of the multi-fingered hand 1 (indicated by the two-headed arrows in FIG. 7B), the system cannot insert the multi-fingered hand 1 between the two parts. In contrast, if the distance data of the part 35, which is adjacent to a target part 37 on the image, in the depth direction of the image is larger than the distance data of the target part 37 in the depth direction, the two parts do not exist in the same plane perpendicular to the depth direction from the imaging plane. For this reason, even if the distance between the two parts on the image is smaller than the thickness of each finger of the multi-fingered hand 1, it is possible to insert the multi-fingered hand 1 between the two parts.

Note that when using the above spatial coding method as three-dimensional distance measurement, this system projects a spatial coding pattern from an illumination apparatus onto a measurement target area, and calculates distance data from an imaging plane in the depth direction using the captured image. Three-dimensional distance measurement is irrelevant to the gist of the present invention, and hence an illustration of the illumination apparatus is omitted from FIG. 1. In addition, a detailed description of image capturing processing and image processing which correspond to three-dimensional distance measurement will be omitted for the same reason.

Note that the position and orientation measurement process in the present invention is not limited to the above technique, and may use other techniques. The position and orientation measurement technique, the hidden area determination technique, and the technique of measuring a relative positional relationship with surrounding objects which are used in the position and orientation measurement process are not irrelevant to the gist of the present invention, and hence a detailed description of them will be omitted. With this process, for example, as shown in FIG. 7B, the positions and orientations of parts 36 to 39 in the parts supply box are measured.

Subsequently, in a gripping state determination process, the system selects a gripping state for a part to be gripped by the multi-fingered hand 1 from the grip priority candidate data set in advance and held in the grip candidate module 22 based on the position and orientation measurement result obtained in the position and orientation measurement process.

Assume that in the position and orientation measurement process, the positions and orientations of the parts 36 to 39 among those shown in FIG. 7B have been measured (assume that other parts have not been recognized in the position and orientation measurement process). In the pile of parts, the parts 36 and 37 are positioned with the head portions 31 facing upward. In addition, in the pile of parts, the part 38 is positioned with the shaft portion 32 lying sideways. In the pile of parts, the part 39 is positioned with the head portion 31 facing downward. The part 36 is positioned with the head portion 31 facing upward like the part 37. The parts 34 and 35 adjacent to the part 36 are present close to each other within the same plane perpendicular to the depth direction from the imaging plane such that the fingers of the multi-fingered hand 1 cannot be inserted between the circumference of the head portion 31 and other parts.

In this case, in the gripping state determination process, first of all, the gripping state determination module 20 selects parts which can be gripped by the multi-fingered hand 1. In this embodiment, the gripping state determination module 20 selects the parts 37 to 39 as parts which can be gripped, while the remaining part 36 is recognized as a part which cannot be gripped for the above reason and excluded from the targets to be gripped. Subsequently, the gripping state determination module 20 determines, as a gripping target part, a part which can be gripped in a gripping state with higher priority. According to the position and orientation measurement result, the part 37 which can be gripped in a gripping state with priority 0 is selected as a gripping target part. In this case, the gripping state with priority 0 is the gripping state required in the assembly process, and hence a gripping state changing process is not executed, as described later (pattern 0).

In contrast, if the position and orientation measurement result does not include the detection of the part 37 (for example, the part 37 is not present in FIG. 7B), the gripping state determination module 20 selects, as a gripping target part, the part 38 which can be gripped in a gripping state with next highest priority (pattern 1). Note that in pattern 1, a grip candidate position on the part 38 which is to be gripped by the multi-fingered hand 1 is set to a predetermined area on the side surface of the shaft portion 32 in advance, as shown in FIG. 6B. In this case, the gripping state determination module 20 determines, as a final gripping position, a position in the area allowing gripping of the part which is closest to the head portion 31. When a gripping position on a part or the relative orientation between the part and the multi-fingered hand is set within a predetermined area range in advance, the grip candidate module 22 selects an actual gripping position according to a rule set in advance. The above rule (selecting a position closest to a head portion) is an example, which can be arbitrarily set in accordance with the shape of a part, the contents of a subsequent process, or the like.

If the position and orientation measurement result does not include the detection of the parts 37 and 38 (for example, the parts 37 and 38 are not present in FIG. 7B), the gripping state determination module 20 selects, as a gripping target part, the part 39 which can be gripped in a gripping state with next highest priority (pattern 2).

Processing corresponding to each of the above three types of patterns 0, 1, and 2 will be described below.

In a gripping process, the information of the determined gripping state is sent to the arm control module 16 and the end effector control module 17. The respective control modules then control the robot arm 2 and the end effector (multi-fingered hand) 1 so as to grip the part in the determined gripping state, thereby gripping the part. In pattern 0, the part 37 is gripped as shown in FIG. 6A. In pattern 1, the part 38 is gripped as shown in FIG. 6B. In pattern 2, the part 39 is gripped as shown in FIG. 6C.

In a part moving process, the arm control module 16 and the end effector control module 17 control the robot arm 2 and the end effector (multi-fingered hand) 1 to move the gripped part to the part assembly start position set in advance.

Concurrently, in a gripping state changing process, the gripping state changing module 21 determines the contents of control of changing the gripping state based on the gripping state (current gripping state) selected in the gripping state determination process and the information of a gripping state required in the assembly process. In addition, the end effector control module 17 controls the end effector (multi-fingered hand) 1 to change the gripping state of the part, based on the determined contents of control of changing. In this case, the gripping state changing module 21 determines whether the gripping state of the part selected first in the above gripping state determination process and executed in the gripping process coincides with the gripping state of the part which is required in the assembly process. If, for example, pattern 0 has been executed in the gripping state, the gripping state of the part coincides with the gripping state of the part required in the assembly process. Therefore, the gripping state of the part is not changed.

If pattern 1 or 2 has been executed in the gripping process, the gripping state of the part is changed to the gripping state required in the assembly process. At this time, in this embodiment, since the contents of control of re-holding operation corresponding to the respective gripping state patterns are also set in advance, the contents of control of operation are selected in accordance with the gripping state pattern before re-holding operation. The end effector control module 17 controls the end effector (multi-fingered hand) 1 based on the selected contents of control of operation, thereby implementing part re-holding operation. As a result, after the gripping state changing process, the part is gripped in the gripping state with priority 0 required in the assembly process, as shown in FIG. 6A, regardless of the gripping state of the part at the time of picking. Note that the contents of control of re-holding operation corresponding to the respective gripping state patterns, which are set in advance, are held in the grip candidate module 22 shown in FIG. 3.

In the assembly process, the arm control module 16 and the end effector control module 17 control the robot arm 2 and the end effector (multi-fingered hand) 1 to perform part assembly operation set in advance. As described above, this embodiment executes the process of inserting the part 11 into the hole 30 of the main body part 8, as shown in FIG. 5.

With the above procedure, this embodiment implements the processing of selectively gripping one of piled-up parts which can be gripped in a gripping state more suitable for the subsequent process (assembly process), changing the current gripping state to the gripping state required in the subsequent process as needed, and executing the subsequent process. In general, the processing procedure is repeated until all of the piled-up parts are processed or no part which can be picked remains.

Figure 8:
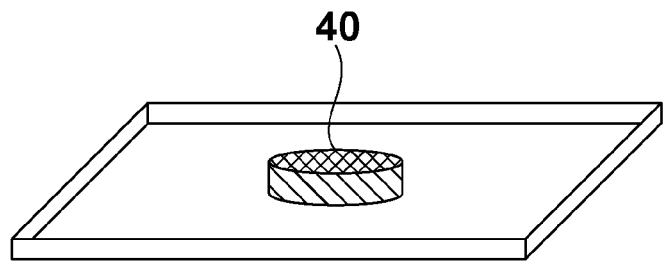
FIG. 8 is a perspective view showing the stable orientation of a part.
Figure 9A:
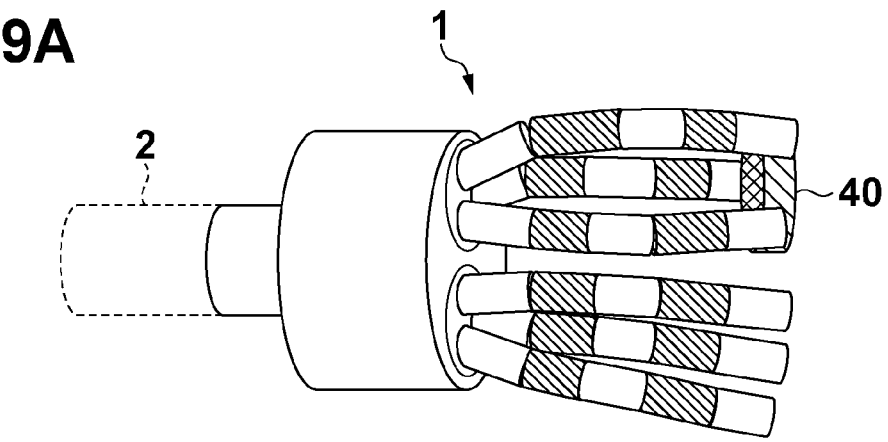
FIGS. 9A and 9B are views each showing how a part is gripped.
Figure 9B:
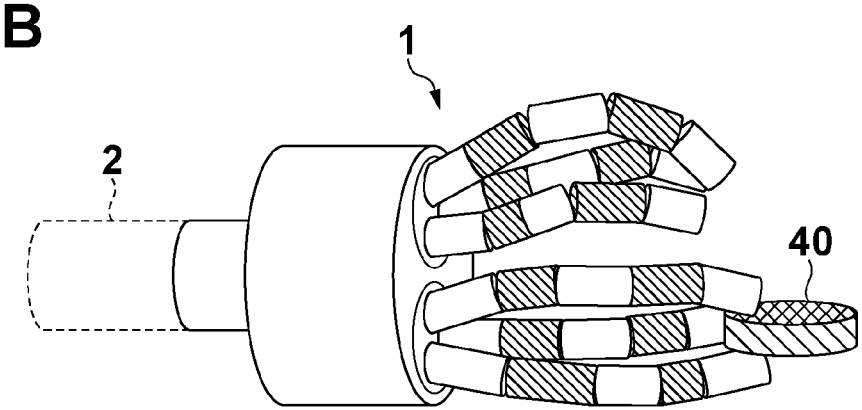

Although the above description has exemplified the operation of picking one of piled-up parts as an example of picking a part, the task to be executed by the object gripping system of the present invention is not limited to this. Consider, for example, a columnar part 40 having a low height relative to the diameter of a cross-section. In general, even if the part 40 is singly supplied, the part is likely to be supplied in an orientation like that shown in FIG. 8, which is a stable orientation, unless using some kind of jig. In this case, if a gripping state like that shown in FIG. 9B is required in the subsequent process, the multi-fingered hand 1 cannot pick the part 40 supplied in a state like that shown in FIG. 8 without any change. In contrast to this, the object gripping system according to this embodiment temporarily grips the part 40 supplied in the state shown in FIG. 8 in the gripping state shown in FIG. 9A, and then changes the way of gripping the object to that shown in FIG. 9B. This makes it possible to change the gripping state to that corresponding to the subsequent process. In this case, the gripping state in FIG. 9B corresponds to priority 0, and the gripping state in FIG. 9A corresponds to priority 1. Although the above case has exemplified the part 40 having a simple shape as shown in FIG. 8, the same applies to a case in which a part has a more complicated shape, and a gripping state in which the part is gripped in a stable orientation does not coincide with a gripping state required in the subsequent process.

Figure 10:
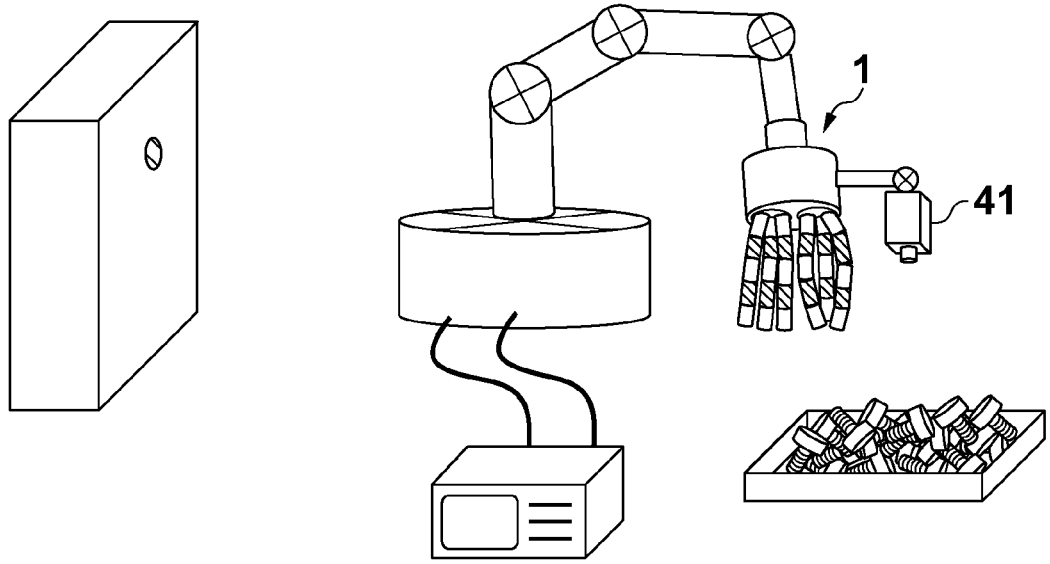
FIG. 10 is a perspective view showing an object gripping system using an on-hand camera.

In addition, the above description has exemplified the arrangement in which the camera 4 is fixed at a predetermined position as shown in FIG. 1. However, the position of the camera and the number of cameras to be used are not limited to those described above. For example, as shown in FIG. 10, a camera 41 may be mounted on the seat portion of the end effector (multi-fingered hand) 1 to form an on-hand camera. In addition, it is possible to use a camera fixed at a predetermined position in combination with the on-hand camera mounted on the seat portion of the end effector (multi-fingered hand) 1, or to switch cameras to be used in accordance with the type of part, the type of process, or the like, or to simultaneously use them.

As described above, the object gripping system according to this embodiment can grip a part in a gripping state more suitable for the subsequent assembly step when picking the part. In addition, when moving the part to the assembly start position, this system can change the gripping state of the part to that corresponding to the assembly process. This makes it possible to execute the process of picking a part and assembling it as a series of processing operations, even if it is not possible to pick the part in a gripping state corresponding to the assembly process. This can shorten the tact time. In addition, selecting a gripping state with a small gripping state change amount can reduce the possibility of dropping the part at the time of part re-holding operation.

(Second Embodiment)

An object gripping system according to the second embodiment picks one of piled-up parts first, and then executes a position and orientation measurement process by using an image obtained by capturing the gripped part again. This embodiment differs from the first embodiment in that it changes the gripping state of the part in a gripping state changing process using the position and orientation measurement result. Therefore, only the differences from the first embodiment will be described in the second embodiment. Other parts are the same as those of the first embodiment, and hence a description of them will be omitted.

Figure 11:
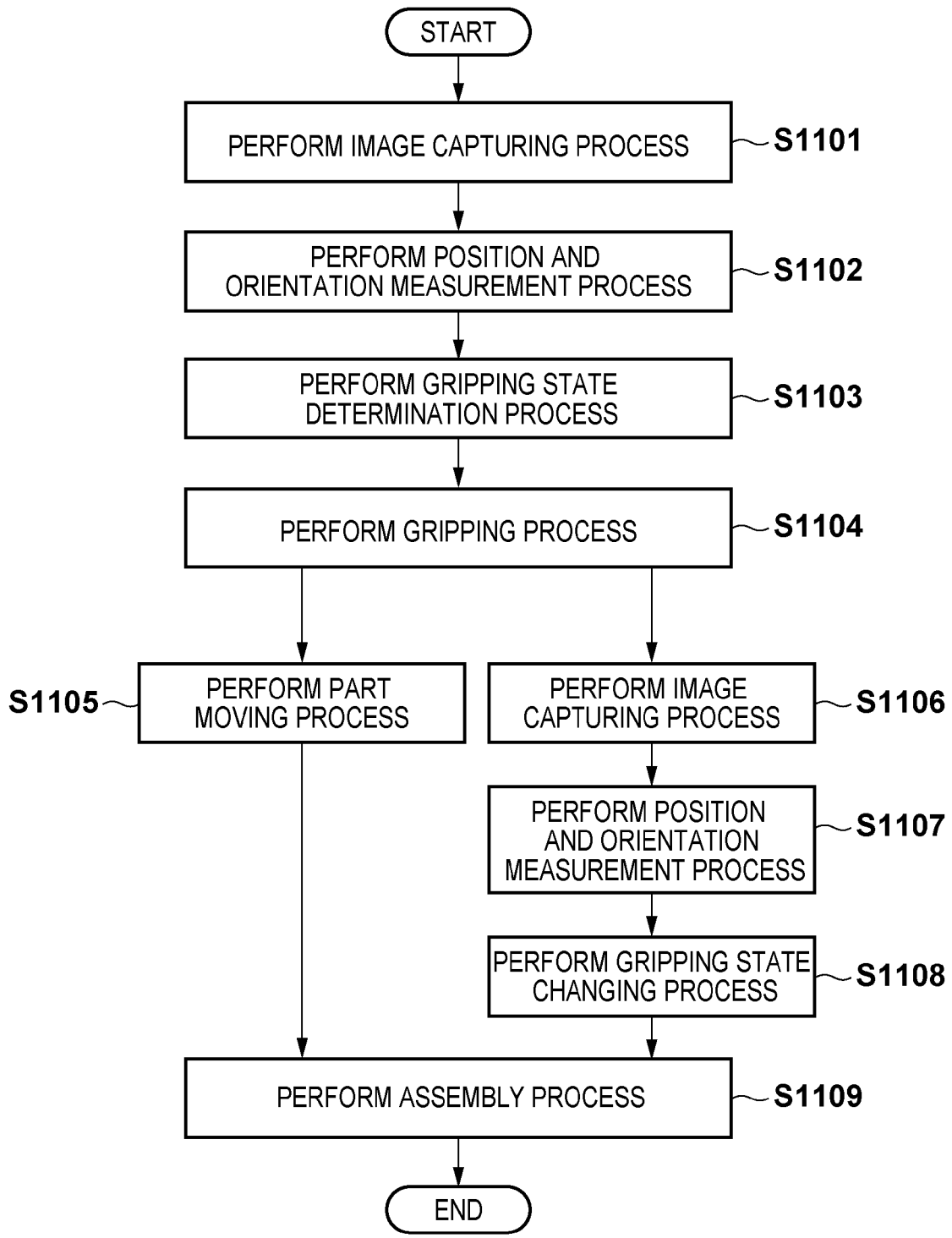
FIG. 11 is a flowchart showing a processing procedure in an object gripping system according to the second embodiment.

A flowchart showing a processing procedure in the object gripping system according to this embodiment will be described with reference to FIG. 11. First of all, this system executes processes from an image capturing process in step S1101 to a part moving process in step S1105 in the same manner as in the first embodiment.

Subsequently, in this embodiment, a camera 4 executes the image capturing process of capturing an image of a gripped part in step S1106. Note that the camera 4 may execute the image capturing process in step S1106 at a timing during movement of the part.

In a position and orientation measurement process in step S1107, a position and orientation measurement module 19 measures the position and orientation of the gripped part by using the image captured by the camera 4.

In a gripping state changing process in step S1108, a gripping state changing module 21 determines the contents of control of changing the gripping state based on the position and orientation measurement result on the gripped part and the information of the gripping state required in the assembly process. An end effector control module 17 controls an end effector (multi-fingered hand) 1 to change the gripping state of the part, based on the determined contents of control of changing. At this time, the gripping state changing module 21 calculates the contents of control of operation of the end effector (multi-fingered hand) 1, associated with re-holding operation, with the position and orientation measurement result being regarded as an initial state. When picking a part in the gripping process in step S1104, the actual gripping state may differ from the gripping state determined in the gripping state determination process in step S1103 in advance due to the influence of the positional shift of the part at the time of picking or the like. When handling a part having a complicated shape, for example, part re-holding operation may differ from ideal operation due to the influence of this difference. This may lead to a mistake such as dropping the part. In contrast to this, when calculating the contents of control of operation of the end effector (multi-fingered hand) 1 associated with part re-holding operation, this embodiment regards the position and orientation of the gripped part as an initial state. This makes it possible to eliminate the influence of the difference caused in the gripping state of the part in the gripping process in step S1104.

In the part moving process in step S1105, the system executes position and orientation measurement by using images obtained by capturing the part and its surrounding environment, as needed, with the camera 4 during movement of the gripped part. It is possible to calculate the contents of control of operation of the end effector (multi-fingered hand) 1 associated with re-holding operation, as needed, based on this position and orientation measurement result. In this case, it is possible to determine, based on the position and orientation measurement result, a state in which the end effector may drop the part or a state in which the end effector or the part may come into contact with surrounding objects and to correct the contents of control of operation of the end effector (multi-fingered hand) 1 so as to avoid such a state.

Note that this embodiment is configured to calculate the contents of control of operation of the end effector (multi-fingered hand) 1 again. However, it is possible to adjust the contents of control of re-holding operation set in advance in accordance with each gripping state like that described in the first embodiment by using the position and orientation measurement result on the gripped part.

The assembly process in step S1109 to be executed subsequently is the same as that in the first embodiment.

Note that the arrangement of the camera is also the same as that in the first embodiment. For example, it is possible to use a camera fixed at a predetermined position at the time of picking of a part and use an on-hand camera when capturing an image of a gripped part.

As described above, the object gripping system according to this embodiment can eliminate the influence of a difference caused at the time of gripping of a part by changing the gripping state of the part based on the position and orientation measurement result on the gripped part. This makes it possible to control the gripping state of a part more accurately.

(Third Embodiment)

An object gripping system according to the third embodiment uses the tact time of an end effector accompanying a change of a gripping state as an evaluation amount instead of a gripping state change amount when setting priority for each gripping state. This point differs from the first and second embodiments. Therefore, only the differences from the first and second embodiments will be described in the third embodiment. Other parts are the same as those of the first embodiment, and hence a description of them will be omitted.

Compare, for example, the gripping states in FIGS. 6B and 6C described in the first embodiment with each other. If the tact time required for the multi-fingered hand 1 to execute re-holding operation to change from the gripping state in FIG. 6B to the gripping state in FIG. 6A corresponding to the subsequent process is shorter than the tact time required to change from the gripping state in FIG. 6C to the gripping state in FIG. 6A, priority 1 is assigned to the gripping state in FIG. 6B, and priority 2 is assigned to the gripping state in FIG. 6C. In this case, selecting a gripping state with higher priority in the gripping state determination process can shorten the tact time taken for the gripping state changing process. Assume that the tact time required for a part moving process is three sec, the tact time required for a gripping state changing process for a change from priority 1 to priority 0 is two sec, and the tact time required for a gripping state changing process for a change from priority 2 to priority 0 is four sec. In this case, concurrently performing the part moving process and the gripping state changing process can complete the gripping state changing process by the time the part moving process is complete, when changing the gripping state from priority 1 to priority 0. When changing the gripping state from priority 2 to priority 0, it is not possible to complete the gripping state changing process by the time the part moving process is complete, and it is necessary to wait for the completion of the gripping state changing process before starting a part assembly process as a subsequent process.

In addition, when concurrently executing the part moving process and the gripping state changing process, the magnitude of the tact time required for the gripping state changing process directly influence the tact time of the overall system. In general, an increase in tact time leads to an increase in manufacturing cost, and hence it is required to further shorten the tact time.

In contrast to this, the object gripping system according to this embodiment can shorten the tact time of the overall system by using, as an evaluation amount, the tact time of the end effector which accompanies a change in gripping state, as described above.

(Fourth Embodiment)

An object gripping system according to the fourth embodiment does not set any priorities for the gripping states of a part. This point differs from the first to third embodiments. Therefore, only the differences from the first to third embodiments will be described in the fourth embodiment. Other parts are the same as those of the first to third embodiments, and hence a description of them will be omitted.

The object gripping system according to this embodiment holds, in a grip candidate module 22, positions on a part at which it can be gripped and the relative orientations between the part and an end effector (multi-fingered hand) 1.

In a gripping state determination process, the system determines a position on the part at which it can be gripped and the relative orientation between the part and the end effector from the information held in the grip candidate module 22 based on a position and orientation measurement result. When selecting proper candidates from the positions on the part at which it can be gripped and the relative orientations (gripping directions) between the part and the end effector, which are set in advance, it is possible to select a gripping position and a relative orientation based on, for example, evaluation amounts corresponding to a gripping state required in the subsequent process. In this case, as evaluation amounts, it is possible to set, for example, physical distances from a gripping position in the gripping state required in the subsequent process.

In addition, in the gripping state changing process, the system selects corresponding contents from the candidates of the contents of control of operation of the end effector (multi-fingered hand) 1 associated with re-holding operation set in advance based on the determined gripping state and the gripping state required in the subsequent process. Alternatively, the system may execute position and orientation measurement by using images obtained by capturing a part and its surrounding environment, as needed, and calculate the contents of control of operation of the end effector (multi-fingered hand) 1 associated with re-holding operation based on the position and orientation measurement result.

As described above, the object gripping system according to this embodiment is characterized by setting no priorities for the gripping states of a part, and has the same effects as those of the first to third embodiments.

(Fifth Embodiment)

In an object gripping system according to the fifth embodiment, an end effector functioning as a gripping unit has a gripper mechanism. This point differs from the first to fourth embodiments. Therefore, only the differences from the first to fourth embodiments will be described in the fifth embodiment. Other parts are the same as those of the first to fourth embodiments, and hence a description of them will be omitted.

Figure 12A:
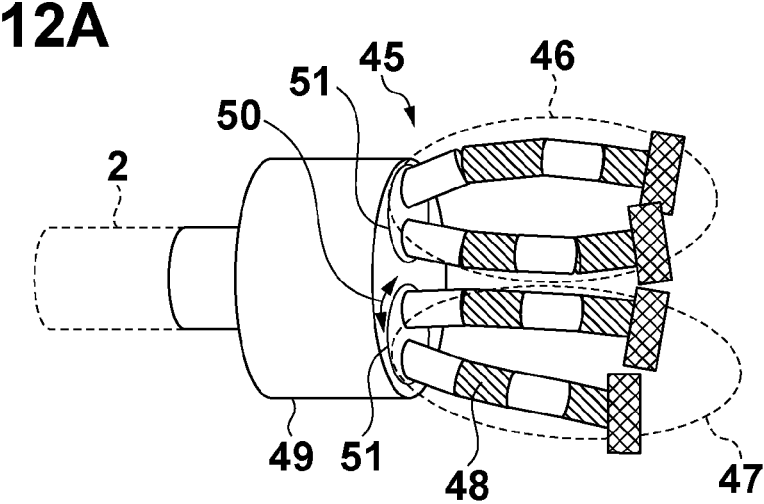
FIGS. 12A to 12C are perspective views each showing an end effector according to the fifth embodiment.

The arrangement of a gripper 45 as an end effector will be described with reference to FIGS. 12A to 12C. As shown in FIG. 12A, the gripper 45 in this embodiment includes an initial gripper 46 to be used to grip one of piled-up parts and a re-holding gripper 47 to be used when it is necessary to change the gripping state of a part to that required in an assembly process. Each gripper holds a part by two-point support. The gripper 47 in this embodiment has extensible portions (the hatched portions in FIG. 12A), and hence changes the length of each shaft, as needed, at the time of re-holding operation. A seat portion 49 on which the respective shafts are mounted has mechanisms 51 which rotate while keeping the relative positional relationship with the respective grippers, as indicated by an arrow 50 in FIG. 12A.

Figure 12B:
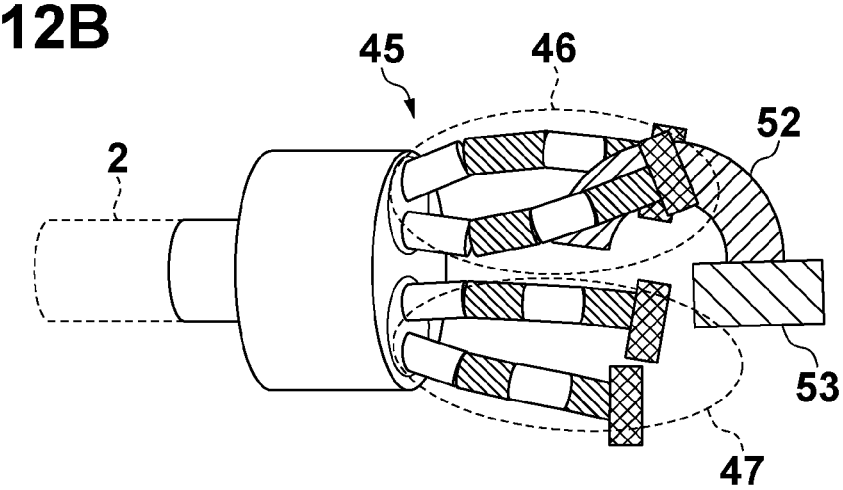
Figure 12C:
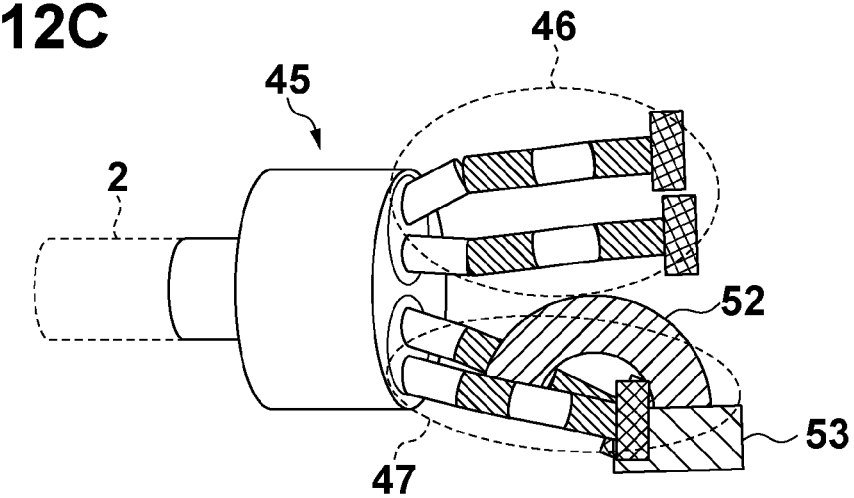

Consider, for example, a case in which the initial gripper 46 is gripping a part 52, as shown in FIG. 12B. In this case, it is possible to change the gripping state of the part 52 by changing the gripping position on the part 52 and the relative orientation between the part 52 and the gripper 45, as needed, by using the re-holding gripper 47. For example, the shafts of the grippers 46 and 47 each have a plurality of joints and are configured to be rotatable. The initial gripper 46 and the re-holding gripper 47 cooperatively operate to perform re-holding operation. FIGS. 12B and 12C show how the grippers 46 and 47 grip the flexible printed board 52 having a connector portion 53.

Note that the arrangement of each gripper is not limited to that described above, and can take any arrangement as long as it can perform re-holding operation.

(Sixth Embodiment)

In an object gripping system according to the sixth embodiment, an end effector functioning as a gripping unit has a suction mechanism. This point differs from the first to fifth embodiments. Therefore, only the differences from the first to fifth embodiments will be described in the sixth embodiment. Other parts are the same as those of the first to fifth embodiments, and hence a description of them will be omitted.

Figure 13A:
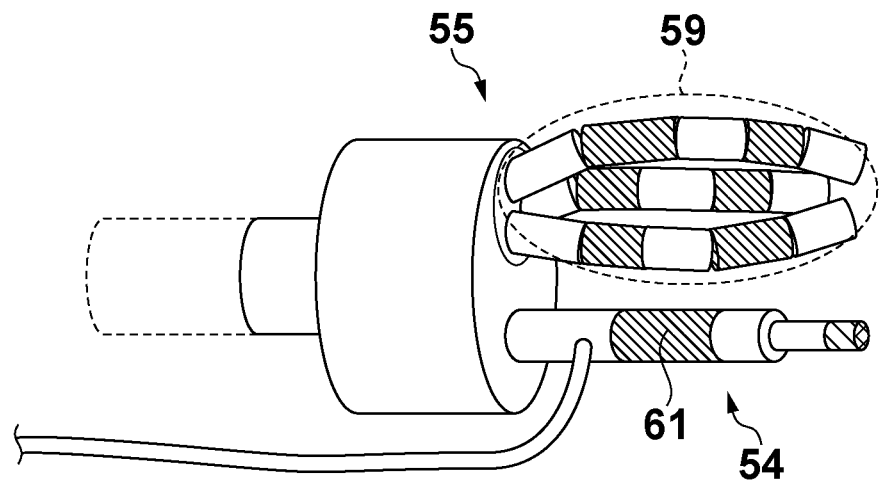
FIGS. 13A and 13B are perspective views each showing an end effector according to the sixth embodiment.
Figure 13B:
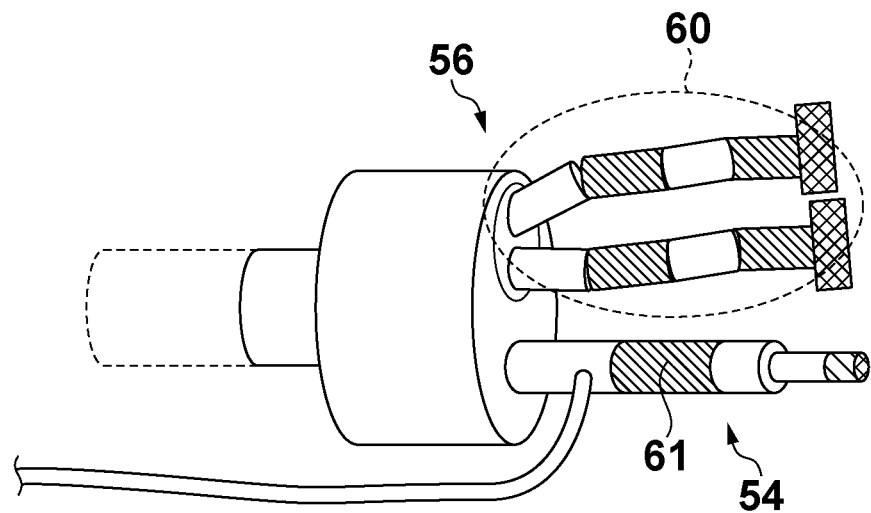
Figure 14:
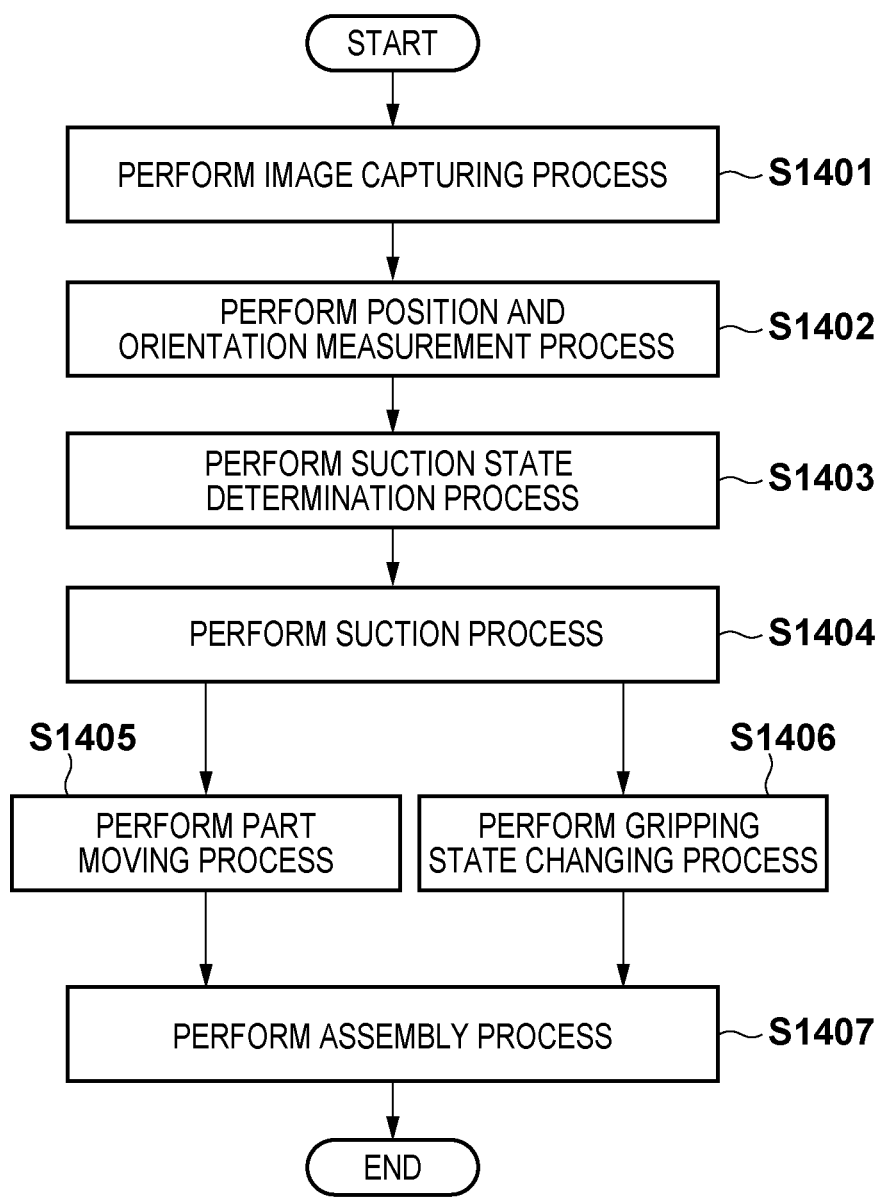
FIG. 14 is a flowchart showing a processing procedure in an object gripping system according to the sixth embodiment.
Figure 15A:
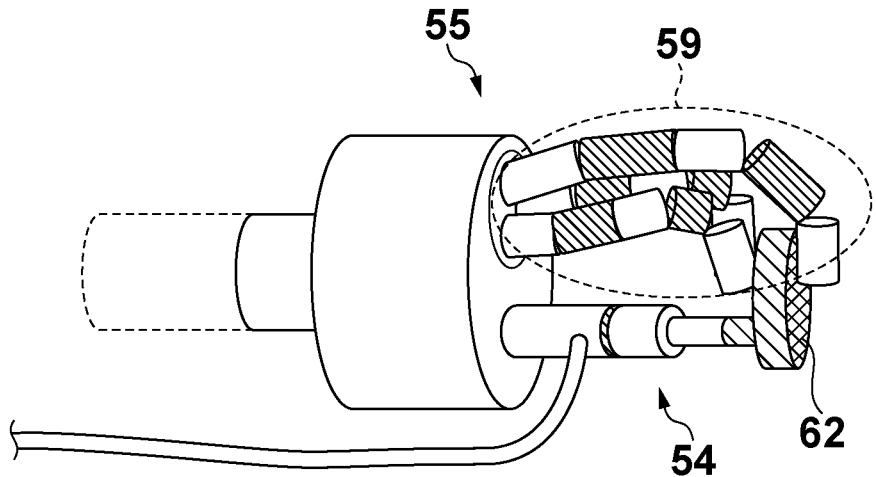
FIGS. 15A and 15B are perspective views each showing how a part is gripped according to the sixth embodiment.
Figure 15B:
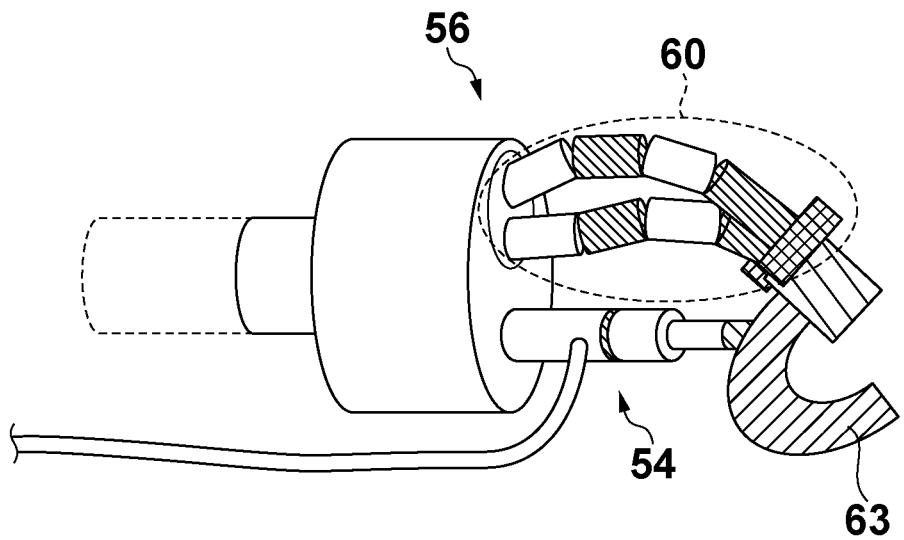

A multi-fingered hand 55 having a suction mechanism 54 will be described with reference to FIG. 13A. A gripper 56 having the suction mechanism 54 will also be described with reference to FIG. 13B. The object gripping system according to this embodiment executes a suction process using the suction mechanism in step S1404, as shown in FIG. 14, instead of the object gripping process described in the first to fifth embodiments. Note that when determining a suction position on a part, the system executes a suction state determination process in step S1403 instead of the gripping state determination process described in the first embodiment. In the suction state determination process, the system executes the process of determining a suction position and the relative orientation between the part and the end effector as in the process of determining a gripping state in the gripping state determination process. In the gripping state changing process in step S1406, the system grips the part, held by the suction mechanism 54, by using a multi-fingered mechanism 59 or a gripper mechanism 60 in a gripping state corresponding to the subsequent process. Note that the suction mechanism 54 in this embodiment has an extensible portion 61 (the hatched portion in FIGS. 13A and 13B) and arbitrarily changes in length, as shown in FIGS. 13A and 13B. FIG. 15A shows how the system grips a part 62, held by the suction mechanism 54, by using the multi-fingered mechanism 59 in a gripping state corresponding to the subsequent process in the gripping state changing process in step S1406. FIG. 15B shows how the system grips a part 63, held by the suction mechanism 54, by using the gripper mechanism 60 in a gripping state corresponding to the subsequent process in the gripping state changing process in step S1406. Other processes (steps S1401, S1402, S1405, and S1407) are the same as those in the above embodiments, and hence a description of them will be omitted.

Note that this embodiment and the first to fifth embodiments have exemplified the multi-fingered mechanism, the gripper mechanism, and the suction mechanism to show concrete examples of the arrangements of end effectors. However, these are examples of implementing the present invention, and the object gripping system of the present invention does not limit the arrangement and function of an end effector as long as it can execute the re-holding operation described above.

(Seventh Embodiment)

An object gripping system according to the seventh embodiment executes a part re-holding process a plurality of number of times in a gripping state changing process. This point differs from the first to sixth embodiments. Therefore, only the differences from the first to sixth embodiments will be described in the seventh embodiment. Other parts are the same as those of the first to sixth embodiments, and hence a description of them will be omitted.

Figure 16A:
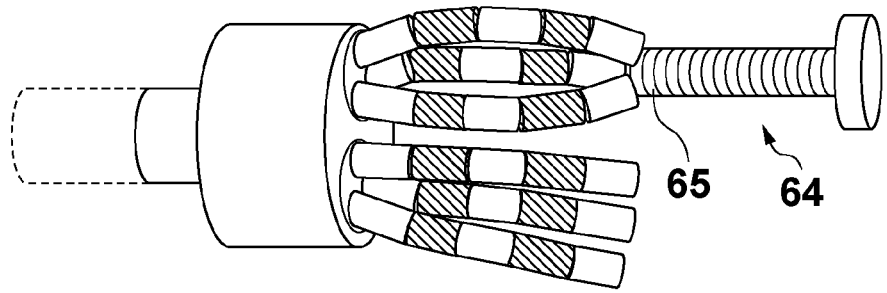
FIGS. 16A to 16D are perspective views showing the processing of changing the gripping state of a part according to the seventh embodiment.
Figure 16B:
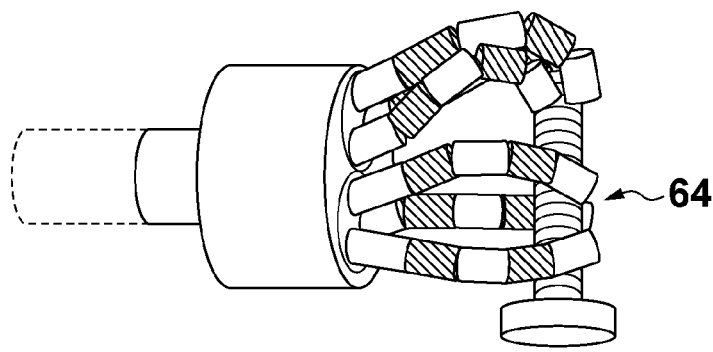
Figure 16C:
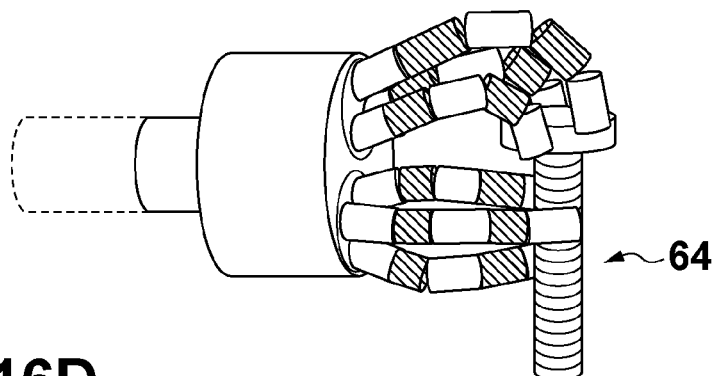
Figure 16D:
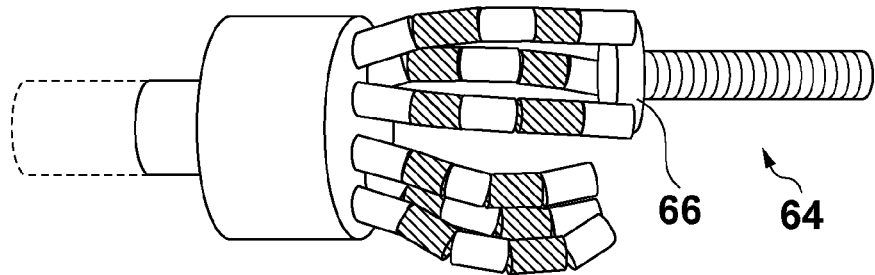

Assume that a target part 64 has a long shaft portion like that shown in FIG. 16A. In this case, when picking such a part from a pile of parts, the part may be hidden by other parts, and the system may be able to grip only a shaft portion distal end position 65, as shown in FIG. 16A. Assume that in this case, a gripping state required in the assembly process as the subsequent process is a state in which a head portion 66 is gripped as shown in FIG. 16D. In this case, when changing the gripping state of the part by using the multi-fingered hand 1 described in the first embodiment, the system may not be able to change the gripping state to that corresponding to the subsequent process by performing a gripping state changing process only once. In contrast to this, this embodiment is configured to change the gripping state to that required in the assembly process as the subsequent process by executing a gripping state changing process a plurality of number of times in the gripping state changing process. FIGS. 16A to 16D show a sequence in the process of changing the gripping state of a part.

It is possible to determine in advance the contents of control of operation of the end effector associated with a plurality of number of times of a gripping state changing process as in the first to sixth embodiments. Alternatively, it is possible to calculate the contents of control of operation from the position and orientation measurement result on a part, calculated from a captured image.

The object gripping system according to this embodiment can change the gripping state a plurality of number of times as described above, and hence can increase the number of types (shapes) of processing target parts to which the system can be applied without expanding the function of the end effector.

According to the present invention, it is possible to grip an object in consideration of a change to the gripping position on an object or relative orientation required in the subsequent process.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-200290 filed on Sep. 7, 2010, which is hereby incorporated by reference herein in its entirety.

What is claimed is:

1. A controller for an object gripping system, the controller comprising:
   a memory; and
   at least one processor coupled to the memory, the at least one processor being configured to perform the functions of:
      a position and orientation measurement unit adapted to measure a position and orientation of at least one target object based on a captured image of the at least one target object;
      a selection unit adapted to select at least one grippable target object from the at least one target object based on the position and orientation; and
      a determination unit adapted to determine a gripping target object from the at least one grippable target object, which is selected by said selection unit, based on priorities set in advance for states including gripping positions or gripping directions,
      wherein the priority is set in advance to be higher with a decrease in an amount of change required to change from a first gripping position and gripping direction to a second gripping position and gripping direction for the gripping target object to be assembled to another object.

2. The apparatus according to claim 1, wherein said determination unit determines, as the gripping target object, a grippable target object in a state with a highest priority.

3. An object gripping system comprising:
   the controller to claim 1;
   a gripping unit adapted to grip the gripping target object, which is determined by said determination unit, in the state with the highest priority, the gripping target object gripped by the gripping unit being a gripped object; and
   a changing unit adapted to change at least one of a gripping position and gripping direction of the gripped object from the first gripping position and gripping direction to the second gripping position and gripping direction in which the gripped object will be assembled to the other object.

4. The system according to claim 3, further comprising an assembly unit adapted to assemble the gripped object to the other object with the second gripping position and gripping direction.

5. The system according to claim 3, further comprising an image capturing unit adapted to capture an image of the at least one target object,
   wherein said image capturing unit captures an image of the object gripped by said gripping unit again,
   said position and orientation measurement unit measures a position and orientation of the at least one target object again based on the image captured again by said image capturing unit, and
   said changing unit changes at least one of a gripping position and a gripping direction of the gripped object gripped by said gripping unit from the first gripping position and gripping direction to the second gripping position and gripping direction for the gripped object to be assembled to the other object, based on the position and orientation measured again by said position and orientation measurement unit.

6. The system according to claim 3, wherein said gripping unit includes one of a multi-fingered mechanism, a gripper mechanism, and a suction mechanism.

7. A robot system comprising the object gripping system according to claim 3.

8. A controller for an object gripping system, the controller comprising:
   a memory; and
   at least one processor coupled to the memory, the at least one processor being configured to perform the functions of:
      a position and orientation measurement unit adapted to measure a position and orientation of at least one target object based on a captured image of the at least one target object;
      a selection unit adapted to select at least one grippable target object from the at least one target object based on the position and orientation from the at least one target object; and
      a determination unit adapted to determine a gripping target object from the at least one grippable target object, which is selected by said selection unit, based on priorities set in advance for states including gripping positions or gripping directions,
      wherein the priority is set in advance to be higher with a decrease in time required to change from a first gripping position and gripping direction to a second gripping position and gripping direction for the gripping target object to be assembled to another object .

9. A method for controlling an object gripping system that includes a processor, the method comprising the steps of:
   measuring, by the processor, a position and orientation of at least one target object based on a captured image of the at least one target object;
   selecting, by the processor, at least one grippable target object from the at least one target object based on the position and orientation;
   determining, by the processor, a gripping target object from the at least one grippable target object which is selected in the selecting step, based on priorities set in advance for states including gripping positions or gripping directions,
   wherein the priority is set in advance to be higher with a decrease in change amount required to change from a first gripping position and gripping direction to a second gripping position and gripping direction for the gripping target object to be assembled to another object.

10. A non-transitory computer-readable storage medium storing a computer program for causing a computer to execute processes in the method according to claim 9.

11. An object gripping method comprising:
gripping the gripping target object which is determined by the method according to claim 9, in the state with the highest priority; and
changing at least one of a gripping position and gripping direction of the gripping target object, which is gripped in the gripping step, from the first gripping position and gripping direction to the second gripping position and gripping direction in which the gripping target object will be assembled to the other object.

12. A non-transitory computer-readable storage medium storing a computer program for causing a computer to execute processes in the object gripping method according to claim 11.

13. A method for controlling an object gripping system that includes a processor, the method comprising the steps of:
measuring, by the processor, a position and orientation of at least one target object based on a captured image of the at least one target object;
selecting, by the processor, at least one grippable target object from the at least one target object based on the position and orientation;
determining, by the processor, a gripping target object from the at least one grippable target object, which is selected in the selecting step, based on priorities set in advance for states including gripping positions or gripping directions,
wherein the priority is set in advance to be higher with a decrease in time required to change from a first gripping position and gripping direction to a second gripping position and gripping direction for the gripping target object to be assembled to another object.

14. A non-transitory computer-readable storage medium storing a computer program for causing a computer to execute processes in the method according to claim 13.

* * * * *